March 8, 1966   R. A. CARLISLE ETAL   3,239,364
PROCESS FOR PRODUCING DECORATIVE PLASTIC SURFACE COVERINGS
Filed Nov. 18, 1959
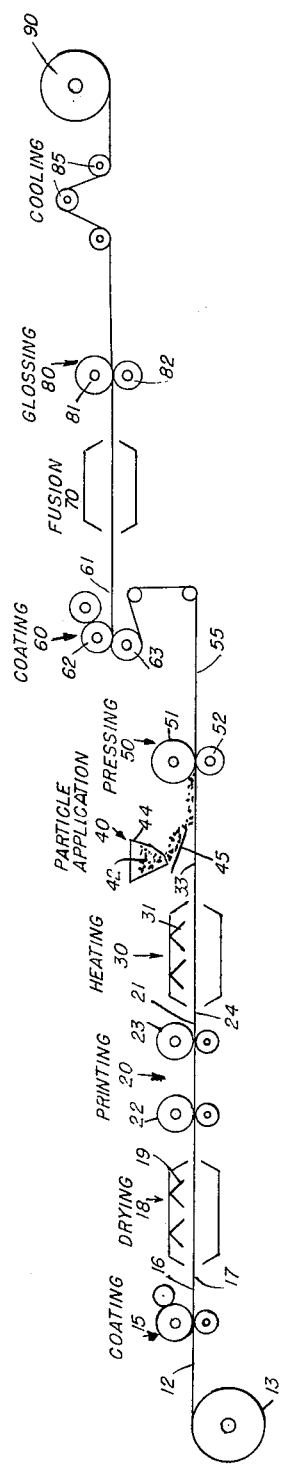
INVENTORS
ROBERT A. CARLISLE
CALMAN PECKER
BY

3,239,364
PROCESS FOR PRODUCING DECORATIVE PLASTIC SURFACE COVERINGS

Robert A. Carlisle, Lawrence, N.J., and Calman Pecker, Long Island City, N.Y., assignors to Congoleum-Nairn Inc., Kearny, N.J., a corporation of New York
Filed Nov. 18, 1959, Ser. No. 853,818
2 Claims. (Cl. 117—9)

This invention relates to decorative surface coverings for floor, walls and the like, and in particular to plastic surface coverings having a three-dimensional appearance and to a method of producing such plastic surface coverings.

Decorative surface coverings having a fibrous base are well-known in the art. It has been conventional practice to impregnate a felt sheet with a water-proofing agent, apply to the surface of the sheet a number of coatings to prevent bleeding of the impregnants and to effect a smooth printing surface, and thereafter print a decorative design on the coated felt by means of a rotogravure press or similar printing apparatus. After the printing, a transparent vinyl plastic coating or film is applied to the surface of the material to give the product wear resistance. The thickness of the surface coating or film obviously determines the degree of wear resistance of the product and the service life of the product.

The most conventionally used wear surface is a coating of vinyl chloride resin of approximately four mil thickness. This type of product has relatively limited service life and, therefore, the product is generally installed without the utilization of adhesives. The use of the rotogravure printing techniques makes possible an unlimited variety of designs. Certain printing techniques make it possible to give the product a certain amount of depth but as a general rule because of the thin wear layer of the product, it has a flat and limited dimensional appearance.

Plastic surface coverings of substantial thickness comprising resinous binders, stabilizers, fillers, and pigments without fibrous backings have come into widespread use. These products have been prepared in a wide range of patterns and decorations, simulating most of the effects which can be produced with stone flooring materials such as marble and terrazzo. Recently, such plastic surface coverings having a translucent or three-dimensional appearance have been introduced in the market. This type of floor covering is prepared by mixing or blending transparent plastic chips with pigmented plastic chips and thereafter molding to produce the finished product. These products although very attractive are high in price which severely limits their market.

An object of the invention is to provide a printed floor covering having a three-dimensional appearance. Another object of the invention is to produce such a floor covering having a relatively thin wear layer. A further object of the invention is to produce a floor covering having a scintillating appearance. Other objects and the advantages of the invention will appear hereinafter.

In accordance with the invention, a printed floor covering having a three-dimensional appearance is produced by coating an impregnated flooring felt or other backing material with a thermoplastic base coat, printing a design on the base coat, heating the printed product to soften the base coat, distributing at random over the surface of the coated backing material small flat pieces of decorative material compatible with the wear layer subsequently applied, passing the coated goods to a pressing element whereby the small pieces are adhered to the softened coating and thereafter coating the surface of said product with a uniform wear layer of transparent vinyl plastic composition.

The decorative pieces must be substantially thinner than the total thickness of the transparent vinyl plastic wear layer. The mechanical forces exerted in the adhering of the decorative pieces and the application of the transparent wear layer tends to dispose, or give the appearance of being disposed, the decorative pieces so that instead of being on a single plane throughout the goods, they appear at various levels throughout the thickness of the wear layer. This results in a product having a three-dimensional appearance even though the total thickness of the wear layer is as low as four mils.

The invention will be better understood from the following detailed description when read in conjunction with the accompanying drawings wherein FIGURE 1 is a schematic representation illustrating one embodiment of a method of producing a decorative sheet in accordance with the invention.

FIGURE 2 is a plane view of the product produced in accordance with the invention.

FIGURE 3 is a cross-section of the product produced in accordance with the invention.

A resilient base sheet such as impregnated felt or a plastic sheet 12 is supplied to the apparatus from a roll 13. The impregnated felt 12 is then passed through a coater generally indicated at 15 which applies a thin uniform thermoplastic base coat 16 to the surface of the backing. If felt is used as the backing, this coating can serve to seal the felt impregnant and to provide a smooth printing surface. The coated backing 17 is then passed through a drying operation generally indicated at 18 if it is necessary to dry the coating. The dryer can be a series of infra-red heat lamps 19 or any other type of heating equipment. The backing is then passed through a printing operation generally indicated at 20 where a suitable design 21 is printed on the surface of the coated backing. The design is conveniently produced by gravure cylinders 22 and 23 which are suitably etched to reproduce the desired design. Ink or other printing fluid is supplied to the surface of the cylinders and transferred to the surface of the felt thereby forming the design. In FIGURE 1, two cylinders are shown which could print a two color design. Any number of cylinders can be used but five such cylinders usually give sufficient color combinations to produce any color desired. The printed backing 24 is then subjected to a heating operation generally indicated at 30 to soften the coating. Any type of heater can be used such as a bank of infra-red lamps 31. The heated coating 33 while in a tacky state is passed under a distributor generally indicated at 40 which places thin decorative pieces 42 uniformly across the surface of the heated sheet 33. The distributor 40 can be any of the conventional distributors such as a hopper 44 and vibrating plate 45. The covered sheet 46 is then passed through a pressing unit generally indicated at 50 such as two opposed rolls 51 and 52 which partially or fully imbeds the pieces 42 into the base coat. The sheet 55 having the pieces imbedded in its surface is passed to a coater generally indicated at 60 which applies a transparent plastic wear layer 61 to the surface of the decorated sheet 55. The coater illustrated is a reverse roll coater which applies the coating material from the surface of one roll 62 as the sheet passes between the nip of such roll and a back up roll 63. The coated sheet is then passed through a heating chamber generally indicated at 70 which heats the wear layer coating to fuse the resin. The sheet is passed from the heater to a finishing unit generally indicated at 80 comprising two opposed rolls 81 and 82 to smooth the surface of the sheet. The sheet is thereafter cooled by passing over cooling rolls 85 and wound on a roll 90.

The flexible backing can be a woven, felted or a solid sheet of synthetic or natural material. The conventional flexible backing is a web of felted fibers. The felt generally is produced using a Fourdrinier or cylinder paper machine with the thickness of the resulting sheet being that usually used in floor and wall coverings, that is, from 0.02 to 0.08 inch. A thickness of about 0.047 inch is usually preferred. The fibrous material used is normally cellulosic in origin, although other fibers can be used including those of mineral and animal origin. The sources of cellulosic material can include cotton or other rag material, wood pulp including both ground wood and chemical wood pulp, paper, boxes, or mixtures thereof in any proportion. The web can also contain fillers such as wood flour.

The felt is normally strengthened and improved in water resistance by impregnation with a bituminous material. Numerous bituminous materials are well known as impregnants in the production of printed surface coverings and include asphalts of petroleum or natural origin and tars and pitch residues of animal or vegetable origin. These materials can be treated to attain the desired physical properties of softening point or viscosity for satisfactory impregnation by such treatment as air blowing, steam distillation and the like.

The impregnant should be uniformly dispersed throughout the felt sheet. This can be controlled to some extent by the saturating technique through use of pressure rolls in the saturating bath. Where the impregnant is not uniformly dispersed throughout the felt blistering can frequently occur due to high concentrations of material adjacent to one surface of the felt.

Other impregnants for the fibrous sheet can also be used to form backing sheets for use in the production of printed surface coverings in accordance with the invention. Such materials as phenol-formaldehyde and phenol-urea resins, polymerized vinyl compounds, such as polyvinyl chloride, polyvinyl acetate and the like, cellulose acetate, celluose nitrate, butadiene-styrene copolymer, butadiene acrylonitrile copolymer, natural rubber and the like can be used. Polymerizable materials can also be incorporated into the felt and the sheet subjected to heat to cure and polymerize the material. Such materials as natural and synthetic drying oils, mixtures of polyhydric alcohols and polybasic acids which cure to form polyesters, mixtures of polyhydric alcohols and polyisocyanates which cure to form urethane polymers, and the like can be used. In general, asphalt is the preferred impregnant due to its extremely low cost.

The impregnated backing sheet is usually provided with one or more seal coats prior to the application of the decorative design. The seal coats perform the desirable function of masking the color of the impregnant and preventing its bleeding through and staining the wear layer and in addition create a smooth uniform surface suitable as a base for printing. Felt sheets of the type commonly used as backings for printed surface coverings tend to have minor surface irregularities due to non-uniformities in the felt making equipment. The sheet also frequently shows a number of small protruding lengths of fibers. The seal coats are designed to hide all these irregularities. The total thickness of seal coats required is normally from about 4 to about 12 mils. This thickness can be created through use of a single thick coating or several superimposed thinner coatings. Using the conventional techniques of coating such as flexible doctor roller application, the desired thickness is created by use of more than one coating. The use of multiple coatings is also desirable in promoting optimum adhesion of the wearing surface layer to the backing, since the seal coat applied directly to the fibrous backing can be designed for optimum sealing against migration of bituminous impregnant and the uppermost seal coat can be designed for optimum adhesion to the polyvinyl chloride wearing surface layer. Such seal coats if of a thermoplastic nature can be used as the base coat.

The base coat is conveniently applied in the form of an aqueous emulsion of resinous binder and filler. In the preparation of the base coat, a resinous binder and filler are emulsified in water in the presence of conventional wetting agents, thickening agent, anti-foam agents, sequestering agents and the like. After the application of the base coat to the backing sheet, the coating is dried by subjecting the sheet to heat, as for example, in the range of about 100° F. to about 150° F. for about 30 minutes to about 2 hours. Alternatively, drying can be effected by exposing the coated sheet to a temperature of 350° F. to 400° F. for about 30 to about 300 seconds.

The resinous compound of the base coat is preferably a vinyl resin. Suitable resins are commercially available in the form of aqueous dispersions containing from 40 to 50 percent solids. The dispersion can contain, in addition to the plasticizer, resin, pigment and filler, conventional wetting agents, thickening agents, anti-foam agents, sequestering agents and alkali. Suitable wetting agents include the sodium salt of polymerized alkyl aryl sulfonic acid, potassium oleate, alkyl aryl polyether sulfonate, resin acid soap and the like. Ammonium caseinate, borated casein, methyl cellulose, carboxymethyl cellulose, hydroxyethyl cellulose and the like are satisfactory thickening agents. Examples of suitable anti-foam agents are pine oil, silicone anti-foam agents such as Antifoam A manufactured by the Dow-Corning Company, Midland, Michigan, diglycol laurate, and octyl alcohol. Suitable sequestering agents include tetrasodium pyrophosphate and the tetrasodium salt of ethylenediamine tetra-acetic acid. The alkali provides a pH of about 7.0 so that there will be no tendency for the latex to coagulate. Calcium hydroxide, sodium hydroxide, ammonia, and potassium hydroxide are suitable alkalis for this purpose.

Normally, the pigments and fillers are ground with water in the presence of wetting agents, thickening agents and the like and the pigment dispersion is mixed with the vinyl resin and plasticizer later. Alternately, the seal coat can be effectively aplied in the form of a solution using, for example, a solvent such as toluene or methyl ethyl ketone. However, the cost of using solvent and the fire and health hazards created by its use render the method undesirable.

The base coat can contain stabilizers to retard the decomposition of the vinyl resin and increase the life of the product, such as sulfides and sulfites of aluminum, silver, calcium, cadmium, cerium, sodium, magnesium, strontium; lead and tin stearates; oleates and other complexes; glycerine, leucin, alanine, o- and p-aminobenzoic and sulfanilic acids, hexamethylene tetramine, salts including phosphates, stearates, palmitates, oleates, recinoleates, abietates, laurates, salicylates; and the like.

As stated hereinabove, the resin component of the base coat is preferably a vinyl resin, that is, a polymeric material obtained by polymerizing compounds containing at least one —CH=CH= radical. Useful vinyl resins include homopolymers, such as polyvinyl chloride, polyvinyl acetate, polyvinyl propionate, polyvinyl butyrate, polymerized vinylidene chloride, polymerized acrylic acid, polymerized ethyl acrylate, polymerized methyl acrylate, polymerized propyl acrylate, polymerized butyl acrylate, and the like; copolymers of the above with each other such as vinyl chloride-vinyl acetate copolymer, vinylidene chloride-vinyl chloride copolymer, methyl methacrylate-vinyl chloride copolymer, methyl acrylate-ethyl acrylate copolymer, ethyl acrylate-butyl acrylate copolymer, and the like and copolymers of the above with other monomers copolymerizable therewith, such as vinyl esters including vinyl bromide, vinyl fluoride, vinyl chloroacetate, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, chlorostyrene, coumarone, vinyl pyridine and the like; maleic and fumaric acid and their derivatives such as diethyl maleate, dibutyl maleate, dimethyl fumarate and the like; unsaturated hydrocarbon such as ethylene, propylene, butylene and the like; allyl compounds such as allyl acetate, allyl chloride, allyl ethyl ether, and the like; conjugated and cross-conjugated unsaturated compounds such as butadiene, isoprene, chloroprene, 2,3 - dimethylbutadiene - 1,3, divinyl ketone and the like. The monomers listed hereinabove are useful in preparing copolymers with a vinyl resin and can be used as modifiers in the polymerization, in which case they may be present in an amount of a few percent, or they can be used in larger quantities, up to as high as 40 percent by weight of the mixture to be polymerized. If desired, a mixture of vinyl resins can be used in preparing coating paints for use in the invention.

A plasticizer for the vinyl resin is also frequently present in the base coat composition. Suitable plasticizers for the vinyl resin include ester type plasticizer such as tributyl phosphate, dioctyl phthalate, dipropylene glycol dibenzoate, phenyl phosphate, dibutyl tartrate, amyl tartrate, butyl benzyl benzoate, dibutyl sebacate, dioctyl adipate, didecyl adipate and the like, rubbery plasticizers such as butadiene-styrene copolymer, butadiene-acrylonitrile copolymer and the like, and other materials which function as plasticizers such as epoxidized drying oils, aromatic hydrocarbon condensates and the like. Where certain flexible soft vinyl resins are used in formulating the base coat, such as polymers containing large proportions of ethyl acrylate, no plasticizer is needed. However, in most instances, a plasticizer is essential in order to impart the necessary properties of flexibility to the dried seal coat film. The base coat must be compatible with the subsequently applied wear layer.

A decorative design is applied to the coated surface of the sheet after it has dried. This step is conventional and paints and inks normally used for application of a decorative design to a vinyl film or layer are used. The composition is preferably formulated so that the binder of the ink contains an appreciable quantity of a vinyl resin. Suitable vinyl resins include vinyl chloride polymer, vinyl chloride-vinyl acetate copolymer, vinyl chloride-vinyl propionate copolymer, vinyl butyrate polymer, vinylidene chloride polymer, vinylidene chloride-vinyl chloride copolymer, copolymers of vinyl chloride and vinylidene chloride with esters of maleic and fumaric acid, such as dimethyl, diethyl, and dibutyl maleate and fumarate, and the like. Extender resins, such as nitrocellulose, can be employed as a portion of the binder of the ink or paint.

Any of the plasticizers normally present in vinyl printing inks and paints can be used, such as tricresyl phosphate, dioctyl phthalate, polypropylene glycol sebacate, tributyl phosphate, phenyl phosphate, dioctyl sebacate, dibutyl sebacate and the like. The decorative coat contains pigments according to the colors desired and is preferably formulated as a solution in a solvent such as cyclohexanone, methyl ethyl ketone, methyl isobutyl ketone and the like. Stabilizers as described in connection with the seal coat can be used.

The decorative coat can be applied to the base coated surface of the sheet in any way appropriate for producing the particular decoration desired. Any of the rotary graphic art printing processes such as rotogravure, offset printing, or lithography can be used. If desired, the design can be applied by conventional block printing technique.

Improved adhesion and clarity of the design and a reduction in the amount of decorative ink or paint required can be brought about by application of a thin size coat to the base coat. The decorative design is then printed on the dry size coat. The size coat comprises a vinyl resin and a plasticizer and is applied preferably as a solution in a solvent. A typical size coat application is 0.02 pound per square yard of surface.

After printing, the coatings are heated until soft and/or tacky which is usually within the range of about 165° to about 215° F. The decorative material is then sprinkled or otherwise distributed over the surface of the sheet and the sheet passed through a press member such as calendar rolls to partially or fully imbed them in the coatings or adhere them to the surface. The pieces must be of a composition which is compatible with the wear and base coatings. A particularly desirable effect is obtained by using small pieces of metal foil such as aluminum which has been coated with pigmented vinyl coating compositions such as those disclosed above for the base coat. The metal foil should be as thin as possible such as from about 0.0006 to about 0.002 inch. The metal foil can be embossed to give it added luster. It is essential for the decorative elements to be small enough so that during the application of the wear layer, they will appear transposed into various levels of the coating. It has been found that flat decorative particles having a largest dimension of about 0.125 to about 0.005 inch are particularly effective, although particles as large as about 0.25 inch can be used. Larger particles or mixtures of smaller and substantial amounts of larger particles result in the loss of the three dimensional appearance since they resist displacement or appear to be in the same plane. The decorative particles are preferably about 0.001 to about 0.003 inch thick. Unusually decorative effects can be obtained by applying the decorative material to particular areas of the surface in a geometric arrangement. The simplest method of accomplishing this result is to only soften portions of the base coat. This can be carried out for example, by passing the sheet in contact with an engraved or embossed roll so that only the heated raised portions of the roll contact the sheet. Alternately, an adhesive can be printed in the desired design. After applying the decorative elements over the whole sheet, followed by pressing, the sheet is flexed or otherwise treated to remove the decorative elements from the portions of the sheet which were not softened or covered with adhesive. Particularly unusual effects are obtained when the particles are of uniform geometric shape, such as square. The decorative material must have a thickness substantially thinner than the thickness of the wear layer. As a general rule, the pieces should be less than one-half the thickness of the wear layer. The best effect is obtained when the decorative elements are uniformly distributed across the surface of the sheet so that they cover from about 1 to about 10% of the surface area. The decorative pieces are preferably pressed into the base coating with a roll heated slightly above the temperature of the base coating. Careful control is necessary to prevent the pieces from being picked off the surface of the sheet. It is also essential that the temperature of the roll be low enough to prevent the base coat from sticking to the roll. Using the preferred composition, the temperature of the roll should be about 170° to about 250° F. It is important that the decorative material be secured sufficiently to the base coating so that they will adhere thereto and not be readily flexed off. This allows handling of the sheet such as rolling up or otherwise processing it without loss of the decorative material.

The wear layer must be a transparent or translucent composition so that the printed design and decorative pieces are visible from the surface. The invention is particularly applicable to relatively thin wear layer. The wear layer can be from 1 to 15 mils thick, but the best results are obtained with a thickness of from 2 to 5 mils. The composition of the wear layer is preferably a mixture of vinyl resin and plasticizer in the proportions of about 20 to about 60 parts plasticizer for each 100 parts of vinyl resin. The vinyl resins such as described in connection with the base coat are satisfactory, with polymers and copolymers of vinyl chloride being particularly effective.

The wear layer is preferably applied as an organosol, plastisol, or hydrosol. After the coating application, it is dried and then fused as by exposure to infra-red radiation. A temperature of about 350° F. to about 375° F. is normally required for fusion of the resin, although higher or lower temperatures can be used depending on the molecular weight of the vinyl resin and time of heating. If the base coat has not previously been fused, this heat treatment can also serve to fuse such coat.

The following example is given for purposes of illustration:

*Example*

A flooring felt formed on a paper making machine is saturated with approximately 100% by weight of asphalt having a softening point of about 160° F. A base coating is applied to the surface of the felt at approximately 5 mils thickness. The base coating has the following composition:

| | Parts |
|---|---|
| Vinyl chloride resin latex (50% solids) | 30 |
| Butadiene-acrylonitrile copolymer latex (50% solids) | 30 |
| Sodium alkylaryl sulfonate | 2 |
| Titanium dioxide | 14 |
| Whiting | 54 |
| Methyl cellulose suspension (7% solids) | 15 |
| Water | 20 |

The coating is heated to a temperature of 115° F. for a period of 100 minutes to dry the coating. A light application of a size coat is applied to the dried base coat. The size coat has the following composition:

| | Percent |
|---|---|
| Polyvinyl chloride | 12.1 |
| Tricresyl phosphate | 6.5 |
| Methyl ethyl ketone | 81.4 |

A decorative design is applied to the seal coat by means of a multi-cylinder rotogravure printing press using an ink having the following formula:

| | Percent |
|---|---|
| Polyvinyl chloride | 8.3 |
| Pigments | 18.0 |
| Polypropylene glycol sebacate | 14.5 |
| Methyl ethyl ketone | 44.3 |
| Cyclohexanone | 14.9 |

After each cylinder, the sheet is subjected to heat to remove the solvent from the printing ink formulation.

The sheet is then heated to a temperature of approximately 180° F., and passed under a distributor which spreads evenly over the coated surface square decorative elements 1/16 inch square, having a thickness of about 2 mils. The decorative elements are distributed in such a fashion as to uniformly cover approximately 3% of the coated surface. The decorative element comprises an aluminum foil of 0.0008 inch thick having a gold pigmented vinyl chloride composition coating on each surface. The coated felt maintained at the designated temperature with the decorative pieces on its surface is passed between two calender rolls. The calender roll contacting the surface of the sheet has a smooth polished surface maintained at a temperature of about 225° F. The roll contacting the back of the sheet is rubber covered and maintained at approximately 130° F. The calender rolls exert sufficient pressure on the decorative pieces to firmly imbed them into the base coating to a depth equivalent to their thickness. The product is thereafter passed through a reverse roll coater which applies to the surface a clear 4 mil coating having the following formula:

| | Parts |
|---|---|
| Vinyl chloride polymer | 50 |
| Dioctyl phthalate | 17 |
| Toluene | 30 |

The sheet is then passed through a fusion oven maintained at a temperature of approximately 390° F. thereby fusing the vinyl chloride resin in both the base coating and the wear layer coating. The fused sheet as it passes from the heating oven passes over a polishing roll which smooths and polishes the surface. The product is thereafter passed between cooling rolls to reduce the temperature of the coatings to allow it to be wound on a collection roll. The printed surface covering produced was characterized by a high degree of clarity and fidelity of the design. The product had a three-dimensional and scintillating appearance due to the decorative pieces.

Any departure from the foregoing description which conforms to the invention is intended to be included within the scope of the claims.

What is claimed is:

1. A process for producing a decorative surface covering having a three-dimensional appearance which comprises applying a uniform base coating of a thermoplastic resinous composition to a backing, printing a decoration on the coating, printing an adhesive on said printed decoration at designated places, distributing decorative pieces on the surface of the printed base, pressing said decorative pieces to adhere them to the adhesive on said printed base, applying a transparent vinyl composition wear layer over the surface of said decorative pieces and coated base to form a smooth, uniform coating, heating said transparent wear layer to fuse the vinyl resin and thereafter cooling the product.

2. The process of claim 1 wherein said decorative pieces have a thickness of about 0.0006 to about 0.005 inch and a larger dimension of about 0.125 to about 0.005 inch.

References Cited by the Examiner

UNITED STATES PATENTS

| 2,259,347 | 10/1941 | Mallory | 154—124 |
| 2,518,423 | 8/1950 | Jenett. | |
| 2,617,750 | 11/1952 | Le Clair et al. | 154—49 |
| 2,888,975 | 6/1959 | Benedict | 156—298 |
| 2,986,198 | 5/1961 | Kolker et al. | 154—49 |

EARL M. BERGERT, *Primary Examiner.*

CARL F. KRAFFT, *Examiner.*